(12) United States Patent
Kleid

(10) Patent No.: US 10,479,185 B2
(45) Date of Patent: Nov. 19, 2019

(54) HYBRID TRANSMISSION FOR A MOTOR VEHICLE

(71) Applicant: Bayerische Motoren Werke Aktiengesellschaft, Munich (DE)

(72) Inventor: Ralf Kleid, Pfaffenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/869,511

(22) Filed: Jan. 12, 2018

(65) Prior Publication Data

US 2018/0134143 A1 May 17, 2018

Related U.S. Application Data

(63) Continuation of application No. PCT/EP2016/064356, filed on Jun. 22, 2016.

(30) Foreign Application Priority Data

Aug. 25, 2015 (DE) .................. 10 2015 216 183

(51) Int. Cl.
*B60K 6/48* (2007.10)
*B60K 6/40* (2007.10)
(Continued)

(52) U.S. Cl.
CPC .................. *B60K 6/48* (2013.01); *B60K 6/40* (2013.01); *B60W 20/00* (2013.01); *B62M 23/02* (2013.01);
(Continued)

(58) Field of Classification Search
CPC .... B60K 6/48; B60K 6/40; B60K 2006/4825; B62M 23/02; B60W 2300/36
See application file for complete search history.

(56) References Cited

U.S. PATENT DOCUMENTS 6,155,366 A * 12/2000 Lin ..................... B60K 6/383
180/65.25
7,255,188 B2 * 8/2007 Tsukada ................ B60K 6/383
180/220

(Continued)

FOREIGN PATENT DOCUMENTS

CN 201179831 Y 1/2009
CN 101890903 A 11/2010

(Continued)

OTHER PUBLICATIONS

International Search Report (PCT/ISA/210) issued in PCT Application No. PCT/EP2016/064356 dated Sep. 6, 2016 with English translation (seven pages).

(Continued)

*Primary Examiner* — Brian L Swenson
(74) *Attorney, Agent, or Firm* — Crowell & Moring LLP

(57) ABSTRACT

A hybrid transmission for a motor vehicle is provided. The hybrid transmission includes a primary shaft, an electric motor power transmitting mechanism, an electric motor drive shaft, a combustion engine drive shaft, and a combustion engine power-transmitting mechanism. The electric motor drive shaft can be driven by an electric motor and is connected to the primary shaft in a power-transmitting manner via the electric motor power-transmitting mechanism. The combustion engine drive shaft is a crankshaft or is rotatably connected with a crankshaft, and is arranged, at least in sections, in the region between the primary shaft and the electric motor drive shaft. The combustion engine power-transmitting mechanism is arranged adjacent to the electric motor power-transmitting mechanism. A hybrid vehicle including such a hybrid transmission is also provided.

18 Claims, 2 Drawing Sheets

(51) Int. Cl.
*F16H 7/02* (2006.01)
*B60W 20/00* (2016.01)
*B62M 23/02* (2010.01)

(52) U.S. Cl.
CPC ........ *F16H 7/02* (2013.01); *B60K 2006/4825* (2013.01); *B60W 2300/36* (2013.01); *Y02T 10/6221* (2013.01); *Y02T 10/6252* (2013.01)

(56) References Cited

U.S. PATENT DOCUMENTS

| | | | | |
|---|---|---|---|---|
| 7,527,111 | B2* | 5/2009 | Katsuhiro | B60K 6/44 180/229 |
| 8,556,021 | B2* | 10/2013 | Nomura | B60K 6/40 180/219 |
| 8,557,021 | B2* | 10/2013 | Nishimura | B23K 1/018 228/102 |
| 8,974,340 | B2* | 3/2015 | Chung | B60K 6/50 475/151 |
| 2003/0104901 | A1 | 6/2003 | Fukushima et al. | |
| 2006/0032690 | A1* | 2/2006 | Inomoto | B60K 6/48 180/229 |
| 2010/0236856 | A1 | 9/2010 | Nomura et al. | |
| 2012/0198962 | A1 | 8/2012 | Houle | |
| 2013/0081895 | A1 | 4/2013 | Nomura et al. | |
| 2013/0345008 | A1 | 12/2013 | Torrelli | |
| 2014/0106920 | A1* | 4/2014 | Piazzolla | B60K 6/383 475/5 |
| 2015/0014073 | A1 | 1/2015 | Murakami et al. | |
| 2016/0325615 | A1 | 11/2016 | Yang et al. | |
| 2018/0099675 | A1* | 4/2018 | Boisvert | B60L 3/106 |

FOREIGN PATENT DOCUMENTS

| | | |
|---|---|---|
| CN | 102596614 A | 7/2012 |
| CN | 102821991 A | 12/2012 |
| CN | 102844211 A | 12/2012 |
| CN | 103818227 A | 5/2014 |
| CN | 104114394 A | 10/2014 |
| CN | 204055299 U | 12/2014 |
| CN | 104343898 A | 2/2015 |
| DE | 698 35 451 T2 | 3/2007 |
| DE | 10 2012 211 4 | 1/2013 |
| DE | 10 2012 019 971 A1 | 4/2014 |
| EP | 1 574 379 A2 | 9/2005 |
| EP | 2 236 339 A1 | 10/2010 |
| EP | 2 492 126 A1 | 8/2012 |
| EP | 2 556 977 A1 | 2/2013 |
| GB | 2487933 A | 8/2012 |
| JP | 2015-9648 A | 1/2015 |
| WO | WO 2012/041573 A1 | 4/2012 |
| WO | WO 2015/113425 A1 | 8/2015 |

OTHER PUBLICATIONS

German-language Written Opinion (PCT/ISA/237) issued in PCT Application No. PCT/EP2016/064356 dated Sep. 6, 2016 (eight pages).

German-language Office Action issued in counterpart German Application No. 10 2015 216 183.8 dated Jun. 6, 2016 (six pages).

Chinese-language Office Action issued in counterpart Chinese Application No. 201680029558 dated Jul. 19, 2019 with English translation (18 pages).

* cited by examiner

HYBRID TRANSMISSION FOR A MOTOR VEHICLE

CROSS REFERENCE TO RELATED APPLICATIONS

This application is a continuation of PCT International Application No. PCT/EP2016/064356, filed Jun. 22, 2016, which claims priority under 35 U.S.C. § 119 from German Patent Application No. 10 2015 216 183.8, filed Aug. 25, 2015, the entire disclosures of which are herein expressly incorporated by reference.

BACKGROUND AND SUMMARY OF THE INVENTION

The invention relates to a hybrid transmission for a motor vehicle, in particular for a motorcycle, into which hybrid transmission a torque can be introduced from an electric motor and a torque can be introduced from an internal combustion engine.

Hybrid transmissions are known from automotive technology, such as from US 2013/0345008 A1. As hybrid drives are used in motorcycles, hybrid transmissions are also required for this purpose. The restricted installation space in the case of motorcycles does not allow, however, the hybrid transmissions which are known from automotive technology to be used in motorcycles. There is therefore a need for a hybrid transmission which is of structurally smaller configuration and is therefore also suitable for motorcycles.

It is an object of the present invention to provide a hybrid transmission. This and other objects are achieved by way of a hybrid transmission in accordance with embodiments of the present invention.

According to an exemplary embodiment of the invention, a hybrid transmission for a motor vehicle is provided. The hybrid transmission includes a primary shaft, an electric power transmission mechanism, an electric drive shaft, an internal combustion engine drive shaft, and an internal combustion engine power transmission mechanism. The electric drive shaft can be driven by an electric motor, and is connected in a power-transmitting manner to the primary shaft via the electric power transmission mechanism. The internal combustion engine drive shaft is a crankshaft or can be connected fixedly to a crankshaft so as to rotate with it. The internal combustion engine drive shaft is arranged at least in sections in the region between the primary shaft and the electric drive shaft. The internal combustion engine power transmission mechanism is arranged adjacently with respect to the electric power transmission mechanism. Said exemplary embodiment has the advantage of a more compact overall design and a more efficient attachment of the electric motor to the internal combustion engine. The $CO_2$ emissions can also be reduced as a result.

In accordance with a further exemplary embodiment of the invention, the electric power transmission mechanism is adapted to transmit power within a plane, and the internal combustion engine drive shaft crosses said plane.

In accordance with a further exemplary embodiment of the invention, a hybrid transmission is provided, where the electric power transmission mechanism is a gearwheel drive. A first gearwheel is fastened on the electric drive shaft, a second gearwheel is fastened on the primary shaft, and a third gearwheel which is arranged between the first and second gearwheels is mounted rotatably on the internal combustion engine drive shaft.

In accordance with a further exemplary embodiment of the invention, the electric power transmission mechanism is a belt drive.

In accordance with a further exemplary embodiment of the invention, the internal combustion engine power transmission mechanism is a gearwheel drive which is adapted to transmit power within a plane which is parallel to the plane of the electric power transmission mechanism.

In accordance with a further exemplary embodiment of the invention, the internal combustion engine power transmission mechanism includes a clutch and a gearwheel drive.

In accordance with a further exemplary embodiment of the invention, the hybrid transmission includes, furthermore, an electric motor for driving the electric drive shaft, where the electric motor is arranged, with regard to the electric power transmission mechanism, on the opposite side to the internal combustion engine power transmission mechanism.

In accordance with a further exemplary embodiment of the invention, the hybrid transmission includes, furthermore, a secondary shaft which is arranged parallel to the primary shaft.

Furthermore, the invention relates to a hybrid motor vehicle including a hybrid transmission in accordance with any one of the preceding exemplary embodiments.

In accordance with a further exemplary embodiment, the hybrid motor vehicle is a hybrid motorcycle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
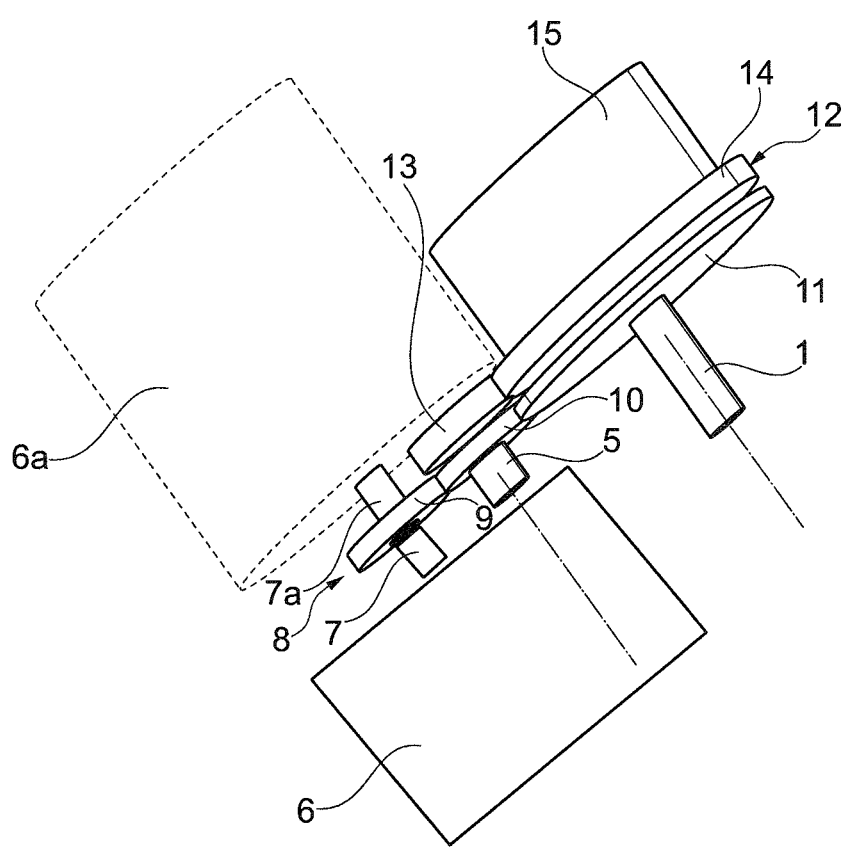
FIG. 1 is a diagrammatic three-dimensional view of a hybrid transmission in accordance with an exemplary embodiment of the invention.
Figure 2:
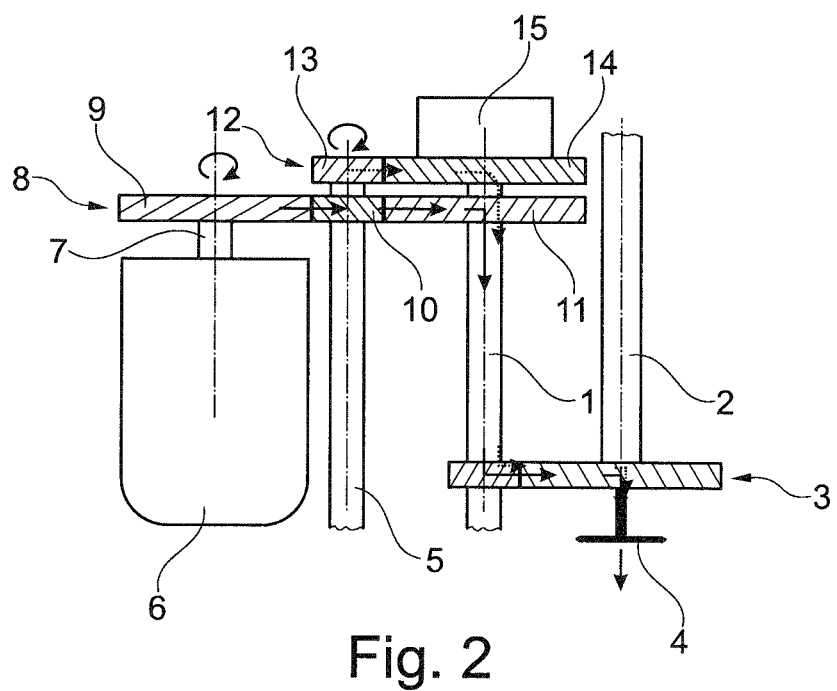
FIG. 2 is a diagrammatic view of the hybrid transmission in accordance with the exemplary embodiment of the invention.

FIG. 1 shows a diagrammatic three-dimensional view, and FIG. 2 shows a diagrammatic view of a hybrid transmission in accordance with an exemplary embodiment of the invention. The hybrid transmission serves, in particular, for use in e.g., hybrid motorcycles, such as hybrid motorbikes or hybrid motor scooters, that is to say two-wheeled vehicles with both an internal combustion engine and an electric motor for propulsion.

The hybrid transmission includes a primary shaft 1 and a secondary shaft 2. Here, a person skilled in the art of transmissions understands a primary shaft to be a shaft, via which drive power is introduced, and a secondary shaft to be a shaft, via which drive power is output, for example to a sprocket of a chain drive of a motorcycle. In other words, the power flow for propelling the motor vehicle is directed, in a manner which comes from an internal combustion engine or electric motor, from the primary shaft to the secondary shaft. With reference to FIGS. 1 and 2, the primary shaft 1 and the secondary shaft 2 are mounted such that they can be rotated about their respective longitudinal axes, and are preferably arranged parallel to each other. The primary shaft 1 is connected to the secondary shaft 2 via a gearwheel drive 3, including two gearwheels. The secondary shaft 2 is connected in a torque-transmitting manner to a drive element 4

(for example, a chain sprocket) which forwards drive power to a drive wheel or drive wheels of the motor vehicle.

An internal combustion engine drive shaft 5 is either a crankshaft of the internal combustion engine (not shown) of the motor vehicle, or it is connected fixedly to the crankshaft so as to rotate with it, for example in the form of an extension of the crankshaft. The internal combustion engine drive shaft 5 is preferably oriented parallel to the primary shaft 1 and, with regard to the latter, is arranged on the opposite side of the secondary shaft 2.

An electric motor 6 for providing drive power of the vehicle by way of electric energy drives an electric drive shaft 7. The electric drive shaft 7 is oriented, in particular, parallel to the internal combustion engine drive shaft 5, and is arranged in such a way that the internal combustion engine drive shaft 5 is arranged in the region between the electric drive shaft 7 and the primary shaft 1. A torque which is supplied by the electric motor 6 can be transmitted from the electric drive shaft 7 via an electric power transmission mechanism 8 to the primary shaft 1. In the case which is shown, the electric power transmission mechanism 8 includes three gearwheels 9, 10 and 11 which form a gearwheel drive. The gearwheel 9 which is fastened to the electric drive shaft 7 engages into the gearwheel 10 which is mounted rotatably on the internal combustion engine drive shaft 5, and the gearwheel 10 in turn engages into the gearwheel 11 which is fastened on the primary shaft 1. Here, the diameter of the gearwheel 10 is smaller than that of the gearwheel 9 and smaller than that of the gearwheel 11. Instead of the gearwheel drive, the electric power transmission mechanism 8 can also be configured by way of a belt drive, for example a Poly V belt drive, in the case of which a belt pulley which is fastened on the electric drive shaft 7 forwards the drive power via a belt to a belt pulley which is fastened on the primary shaft 1. A chain drive might likewise be provided, in the case of which the belt is replaced by a chain and the belt pulleys are replaced by chain sprockets.

The internal combustion engine drive shaft 5 extends through a plane, within which the electric power transmission mechanism 8 is arranged. At the end of the internal combustion engine drive shaft 5 which is guided through said plane, the drive power which is provided by the internal combustion engine of the motor vehicle and with which the internal combustion engine drive shaft 5 can be loaded can be forwarded by an internal combustion engine power transmission mechanism 12 to the primary shaft 1. The internal combustion engine power transmission mechanism 12 preferably includes a gearwheel drive, having two gearwheels 13 and 14, and a clutch 15. The gearwheel 13 is fastened to the end of the internal combustion engine drive shaft 5 and is smaller than the gearwheel 14 which interacts with it (that is to say, engages into it) and is arranged such that it can be rotated about the rotational axis of the primary shaft 1. Depending on the actuation of the clutch 15, the internal combustion engine drive shaft 5 and the primary shaft 1 can therefore be coupled in a torque-transmitting manner via the internal combustion engine power transmission mechanism 12.

The internal combustion engine power transmission mechanism 12 is arranged, with regard to the electric power transmission mechanism 8, on the opposite side to the electric motor 6. As is shown using dashed lines in FIG. 1, however, and is provided with designations 6a and 7a, an electric motor 6a and an electric drive shaft 7a can also be arranged on the same side (with regard to the electric power transmission mechanism 8) as the internal combustion engine power transmission mechanism 12.

Satisfactory integration into a motorcycle can be realized by way of the compact nature of the above-described hybrid transmission.

Whereas the invention has been illustrated and described in detail in the drawings and the preceding description, said illustration and description is to be understood to be illustrative or exemplary and not restrictive, and the intention is not to restrict the invention to the disclosed exemplary embodiments. The mere fact that certain features are mentioned in different dependent claims should not be construed as indicating that a combination of said features might not also be utilized advantageously. Since modifications of the disclosed embodiments incorporating the spirit and substance of the invention may occur to persons skilled in the art, the invention should be construed to include everything within the scope of the appended claims and equivalents thereof.

What is claimed is:

1. A hybrid transmission for a motor vehicle, comprising:
   a primary shaft;
   an electric power transmission mechanism;
   an electric drive shaft which is drivable by an electric motor, and which is connected in a power-transmitting manner to the primary shaft via the electric power transmission mechanism;
   an internal combustion engine drive shaft which is a crankshaft or is connected fixedly to a crankshaft so as to rotate therewith, the internal combustion engine drive shaft being arranged at least in sections in a region between the primary shaft and the electric drive shaft; and
   an internal combustion engine power transmission mechanism which is arranged adjacently with respect to the electric power transmission mechanism defining a plane,
   wherein the electric power transmission mechanism is adapted to transmit power from the electric drive shaft to the primary shaft within the plane which is perpendicular to the primary shaft.

2. The hybrid transmission according to claim 1, wherein the internal combustion engine drive shaft crosses the plane.

3. The hybrid transmission according to claim 2, wherein the electric power transmission mechanism is a gearwheel drive,
   a first gearwheel is fastened on the electric drive shaft,
   a second gearwheel is fastened on the primary shaft, and
   a third gearwheel which is arranged between the first and second gearwheels is mounted rotatably on the internal combustion engine drive shaft.

4. The hybrid transmission according to claim 3, wherein the electric motor is arranged, with regard to the electric power transmission mechanism, on an opposite side to the internal combustion engine power transmission mechanism.

5. The hybrid transmission according to claim 3, further comprising:
   a secondary shaft which is arranged parallel to the primary shaft.

6. The hybrid transmission according to claim 2, wherein the electric power transmission mechanism is a belt drive.

7. The hybrid transmission according to claim 6, wherein the electric motor is arranged, with regard to the electric power transmission mechanism, on an opposite side to the internal combustion engine power transmission mechanism.

8. The hybrid transmission according to claim 2, wherein the internal combustion engine power transmission mechanism is a gearwheel drive which is adapted to transmit power within a plane which is parallel to the plane of the electric power transmission mechanism.

9. The hybrid transmission according to claim 8, wherein the internal combustion engine power transmission mechanism includes a clutch and a gearwheel drive.

10. The hybrid transmission according to claim 9, wherein the electric motor is arranged, with regard to the electric power transmission mechanism, on an opposite side to the internal combustion engine power transmission mechanism.

11. The hybrid transmission according to claim 1, wherein the electric power transmission mechanism is a belt drive.

12. The hybrid transmission according to claim 1, wherein the internal combustion engine power transmission mechanism includes a clutch and a gearwheel drive.

13. The hybrid transmission according to claim 1, wherein the electric motor is arranged, with regard to the electric power transmission mechanism, on an opposite side to the internal combustion engine power transmission mechanism.

14. The hybrid transmission according to claim 1, further comprising:
a secondary shaft which is arranged parallel to the primary shaft.

15. A hybrid motor vehicle, comprising:
a hybrid transmission according to claim 1.

16. The hybrid motor vehicle according to claim 15, wherein the hybrid motor vehicle is a hybrid motorcycle.

17. The hybrid transmission according to claim 1, wherein the electric motor is arranged, with regard to the electric power transmission mechanism, on a same side to an internal combustion engine.

18. The hybrid transmission according to claim 1, wherein the electric drive shaft is arranged, with regard to the electric power transmission mechanism, on a same side to the primary shaft.

* * * * *